United States Patent
Lipinski et al.

(10) Patent No.: US 9,626,124 B2
(45) Date of Patent: Apr. 18, 2017

(54) DIRECT-ATTACHED/NETWORK-ATTACHED STORAGE DEVICE

(75) Inventors: Greg J. Lipinski, Loveland, CO (US); Phillip M. Walker, Fort Collins, CO (US); Fred Charles Thomas, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1844 days.

(21) Appl. No.: 13/057,122

(22) PCT Filed: Oct. 24, 2008

(86) PCT No.: PCT/US2008/081101
§ 371 (c)(1),
(2), (4) Date: Feb. 1, 2011

(87) PCT Pub. No.: WO2010/047713
PCT Pub. Date: Apr. 29, 2010

(65) Prior Publication Data
US 2011/0138116 A1 Jun. 9, 2011

(51) Int. Cl.
*G06F 13/00* (2006.01)
*G06F 3/06* (2006.01)

(52) U.S. Cl.
CPC .......... *G06F 3/0661* (2013.01); *G06F 3/0607* (2013.01); *G06F 3/067* (2013.01); *G06F 3/0658* (2013.01); *G06F 3/0674* (2013.01)

(58) Field of Classification Search
CPC ..... G06F 3/0601; G06F 3/0674; G06F 3/0683
USPC ........ 711/103, 149, 150, 158; 709/225, 229; 710/20, 36, 40, 313; 712/225
See application file for complete search history.

(56) References Cited

U.S. PATENT DOCUMENTS

| | | | | |
|---|---|---|---|---|
| 5,659,687 A * | 8/1997 | Kim et al. | | 710/112 |
| 6,067,595 A * | 5/2000 | Lindenstruth | | 710/307 |
| 6,384,850 B1 * | 5/2002 | McNally | | G06F 17/30905 707/E17.121 |
| 6,631,453 B1 * | 10/2003 | Friday | | G06F 3/0623 213/200 |
| 6,741,559 B1 * | 5/2004 | Smeulders et al. | | 370/230 |
| 7,134,007 B2 * | 11/2006 | Zimmer et al. | | 713/1 |
| 7,272,687 B2 * | 9/2007 | Balasubramanian | | 711/114 |
| 7,277,715 B2 * | 10/2007 | Starr et al. | | 455/456.1 |

(Continued)

FOREIGN PATENT DOCUMENTS

| | | |
|---|---|---|
| CN | 1522061 A | 8/2004 |
| CN | 1598753 A | 3/2005 |
| CN | 101669110 A | 3/2010 |

OTHER PUBLICATIONS

Lipinski, et al; Notification of Transmittal of the International Search Report and the Written Opinion of the International Searching Authority; or the Declaration; dated May 28, 2009; cited in priority application PCT/US2008/081101 filed Oct. 24, 2008.

*Primary Examiner* — Reba I Elmore
(74) *Attorney, Agent, or Firm* — HP Inc. Patent Department

(57) ABSTRACT

A multi-port data storage device that can be used simultaneously by both a direct-attached device and a network-attached device, comprising a hard disk drive (HDD), a DAS port, an NAS port, and a controller for controlling access to the HDD by the DAS port and the NAS port.

19 Claims, 4 Drawing Sheets

(56) References Cited

U.S. PATENT DOCUMENTS

| | | | |
|---|---|---|---|
| 7,318,150 B2* | 1/2008 | Zimmer et al. | 713/2 |
| 7,389,401 B2* | 6/2008 | Li et al. | 711/203 |
| 7,437,604 B2 | 10/2008 | Davies et al. | |
| 2003/0065821 A1* | 4/2003 | Lee | G06F 15/17337 709/249 |
| 2003/0236953 A1* | 12/2003 | Grieff | G06F 3/0607 711/151 |
| 2004/0076044 A1* | 4/2004 | Nowshadi | 365/200 |
| 2004/0139240 A1* | 7/2004 | DiCorpo et al. | 710/3 |
| 2004/0215786 A1* | 10/2004 | Ohnishi | 709/227 |
| 2005/0102549 A1* | 5/2005 | Davies et al. | 714/4 |
| 2007/0033426 A1* | 2/2007 | Wilson et al. | 713/324 |
| 2008/0140932 A1* | 6/2008 | Flynn | G06F 1/183 711/114 |
| 2009/0125709 A1* | 5/2009 | Martinez et al. | 713/2 |
| 2012/0161924 A1* | 6/2012 | Lin | 340/5.8 |
| 2012/0324067 A1* | 12/2012 | Hari et al. | 709/222 |

* cited by examiner

DIRECT-ATTACHED/NETWORK-ATTACHED STORAGE DEVICE

CROSS-REFERENCE TO RELATED APPLICATION

This application is a national stage application under 35 U.S.C. §371 of PCT/US2008/81101, filed Oct. 24, 2008.

BACKGROUND

Expanded external data storage can be provided to a computer or other device that uses data storage, or to a network, by providing a disk enclosure containing a hard disk drive (HDD), and connecting the enclosure to the computer or to the network. Expanded storage connected directly to a PC or the like is commonly referred to as direct-attached storage (DAS), while expanded storage connected to a network is commonly referred to as network-attached storage (NAS). In home use, there are several common uses for expanded storage. One use is to expand the storage space available to a personal video recorder (PVR) by attaching the additional storage directly to the PVR. Another use is to expand the storage space available to a game console or personal computer (PC) gaming platform by attaching high speed dedicated storage directly to the game console or PC. Still another is to expand the storage space available on a network by attaching the additional storage to the network. An expanded storage device typically comprises a drive enclosure containing one or more hard disk drives (HDDs), although other types of storage can also be used.

A PVR is generally a set top box (STB) that can record television programs on a hard drive contained in the PVR, for viewing on a viewing device such as a television, typically attached to the PVR via a cable. With some PVRs, the storage space of the PVR can be expanded by attaching an expanded storage device to the PVR via a direct attached storage (DAS) port. The expanded storage has a so-called "device-side" DAS port, and the PVR has a so-called "host-side" DAS port. Usually, such DAS ports are universal serial bus (USB) ports, external Serial Advanced Technology Attachment (eSATA) ports, or IEEE 1394 (Firewire) ports. The expanded storage is connected to the PVR by connecting its device-side DAS port to the PVR's host-side DAS port using a cable. The DAS device preferably provides low-cost storage with a dedicated high-speed connection to the PVR, with bandwidth sufficient to record shows directly from the PVR to the device, and to view recorded material stored on the DAS device via the PVR.

Expanded storage can also be added to a network, such as for shared file access and file backup. In that case, storage space can typically be added to the network by attaching expanded storage to the network using a network attached storage (NAS) device. The NAS device comprises an NAS port. The NAS port can be a wired or wireless network connection, but is most commonly an Ethernet port used to connect the NAS device to an Ethernet port on a network hub or switch using an Ethernet cable. A NAS device can also be combined with a built-in wired or wireless network hub, switch, or router. The NAS device provides and manages shared bandwidth to users on the network. Depending on the application, it may or may not be important that the NAS device provide high-speed dedicated bandwidth to a user on the network.

To satisfy needs for both direct attached storage and network attached storage, a user must purchase separate DAS and NAS devices. In general, a DAS device connected to a device such as a PVR and an NAS device connected to a network cannot directly communicate or provide cross access.

It is desirable to provide a single expanded storage device that can satisfy the need for both a DAS device and an NAS device, and provide simultaneous access to its storage assets by a directly attached product such as a PVR and by a user on a network.

SUMMARY

A multi-port data storage device that can be used simultaneously by both a direct-attached device and a network-attached device, comprising a hard disk drive (HDD), a DAS port, an NAS port, and a controller for controlling access to the HDD by the DAS port and the NAS port.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, examples of which are illustrated in the accompanying drawings.

Figure 1:
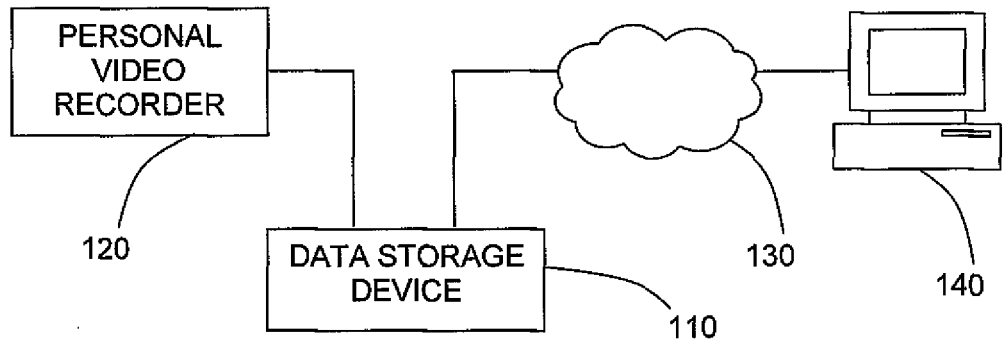
FIG. 1 is a block diagram showing a DAS/NAS storage system in accordance with a herein disclosed embodiment.

Provided is a storage device in a single enclosure, such as a disk enclosure, having both a direct attached storage (DAS) port and a network attached storage (NAS) port. Referring to FIG. 1, shown is an exemplary arrangement 100 of a storage device 110 attached to a personal video recorder (PVR) 120 and to a network attached device 140 via a network 130. Network 130 can be of any conventional type, such as wired or wireless Ethernet network, and can comprise hubs, switches, routers, and the like. Network attached device 140 can be any type of device that can access conventional network attached storage (NAS) via a network, such as a personal computer (PC) on the network. The PVR 120 is attached to the storage device 110 via a direct attached storage (DAS) port on the storage device 110. The network is attached to the storage device 110 via a network attached storage (NAS) port on the storage device 110. PVR 120 can record a show and transfer it to the storage device 110. The recording can then be accessed through the network by network attached device 140. For example, a recorded show stored on the storage device 110 could be viewed through the network on a PC or other network attached viewing device.

Moreover, storage device 110 can serve as ordinary network attached storage (NAS) providing data storage and access for network clients, such as a PC. Although a storage device with only two ports is illustrated, it will be appreciated that the storage device may be provided with any number of DAS and NAS ports by extending the herein described systems and methods.

Figure 2:
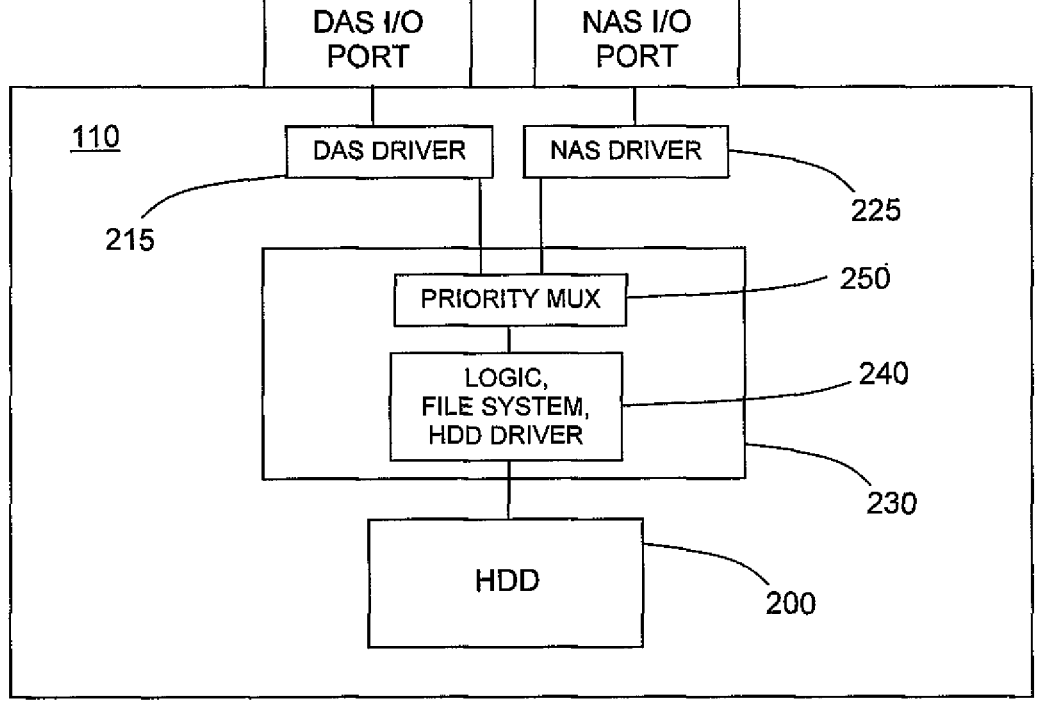
FIG. 2 is a block diagram of a DAS/NAS device in accordance with a herein disclosed embodiment.

Such a storage device can be implemented in various ways. For example, referring now to FIG. 2, shown is an embodiment of the storage device 110. The storage device comprises hard disk drive (HDD) 200. Although a HDD 200 is shown, any type of readable/writable non-volatile random access storage assets can be used, such as flash memory, recordable optical drives, or the like. In addition, although only one HDD is shown, any number of storage assets can be used. Furthermore, two or more drives can be configured to use any desired storage scheme, such as a single concatenated storage volume, a JBOD (just a bunch of disks), a RAID (redundant array of independent/inexpensive disks) mode providing data striping, disk mirroring, distributed parity, and the like.

Also provided are direct attached storage (DAS) input/output (I/O) port 210, and network attached storage (NAS) I/O port 220. The DAS port 210 can be a universal serial bus (USB) port, an external serial advanced technology attachment (eSATA) port, an IEEE 1394 (Firewire) port, or any other type of high-speed wired or wireless direct attached connection. The DAS port 210 is a so-called "device side" port, for providing expanded storage capacity to a device connected thereto, such as a personal video recorder (PVR) 120. The NAS port 220 can be an Ethernet port or any other type of wired or wireless network connection. DAS device driver 215 (such as a USB, IEEE 1394, or eSATA device driver) and NAS device driver 225 (such as an IEEE 802.11 driver) provide for interaction of the I/O ports with controller 230. Controller 230 thus controls access to the HDD 200 by the DAS port 210 and the NAS port 220 through their respective drivers. Controller 230 can comprise a priority multiplexor or mux 250 for coordinating access between the I/O port device drivers 215, 225 and HDD 200. Controller 230 also comprises block 240 which includes operating logic, file system, and device drivers for storage assets, such as HDD 200. The controller 230 can comprise one or more microprocessors, interfaces, memories, integrated circuits, discrete circuit elements, and/or other electronics, to provide access to the HDD 200 and other processing as needed.

In operation, the controller 230 controls access to the HDD 200 for both the DAS port 210 and the NAS port 220. Access to the HDD 200 can be provided by the controller 230 in response to a request for access received via the DAS port 210 or the NAS port 220. In the event requests are received for simultaneous access to the HDD 200 by both I/O ports, priority mux 250 of controller 230 can control access by coordinating active connections with the I/O ports in a predetermined manner, an example of which will be described below. In an embodiment, the controller 230 can provide priority access to the DAS port 210, and defer access by the NAS port 220. For example, this embodiment may be desirable in order to give priority access to a request for HDD 200 access from a PVR 120 connected to the DAS port 210, versus a request for HDD 200 access from a network device connected to the NAS port 220. This may be desirable, for example, because the PVR may have a higher bandwidth requirement than the network, and may not provide much data buffering. In another embodiment, the controller 230 may arbitrate access to the HDD 200 by the DAS port 210 and the NAS port 220. This may be desirable, for example, if the devices attached via both ports have similar bandwidth requirements. In an exemplary implementation cache coherency problems can be avoided, for example, by "layering" the NAS port 220 on top of the DAS port 210. There is then only one cache, and it is owned and managed solely by the DAS port 210. The DAS port 210 is thereby able to internally manage simultaneous access. The result is that, from the perspective of a networked device coupled to the NAS port 220, the storage device 110 appears to be an ordinary NAS device, with slower but otherwise normal access when the resource is locked. A multiplexor layer can alternatively be provided within the DAS port 210, which is then able to manage contention between direct access and NAS access. Various embodiments can manage both disk level (sector) and file system level access contention via well known hardware or software resource locking mechanisms, such as mutexes, critical sections, etc., to guarantee atomicity, consistency, and isolation of serialized access during both read and write access. Still other embodiments may disallow write access to the NAS port 220, the DAS port 210, or both (thereby providing read-only access).

In an embodiment, the controller 230 can comprise an operating system (OS) running on a processor, and the OS can comprise drivers 215, 225 to support a device-side DAS port 210 and a NAS port 220. In addition, the OS can comprise HDD driver and other software to control access to the HDD 200 for both ports. Further, the OS can include logic for handling requests from both ports for simultaneous access to the HDD 200, for example, in conjunction with priority mux 250. In the case of such requests for simultaneous access, the OS can implement priority scheduling of the driver processes or interrupt service routines (ISRs) to provide the desired access scheme (such as DAS priority, or arbitrated access). In an embodiment, handling of requests for simultaneous access is provided by a real-time OS.

In another embodiment, handling of requests for simultaneous access is provided by a non-real-time OS such as Microsoft Windows™, and the desired access scheme can be implemented using a low level disk driver. Such a disk driver can exist above the physical and device layers, but below the filesystem layer of the Windows Driver Model (WDM). (WDM provides a mechanism for developing layered drivers, and also for inserting filter drivers either above or below device or interface drivers in the stack.) In addition to providing for a desired access scheme in response to requests for simultaneous HDD 200 access from the DAS 210 and NAS 220 ports, such a disk driver can also provide a quality of service (QoS) mechanism for at least one of the ports.

Figure 3:
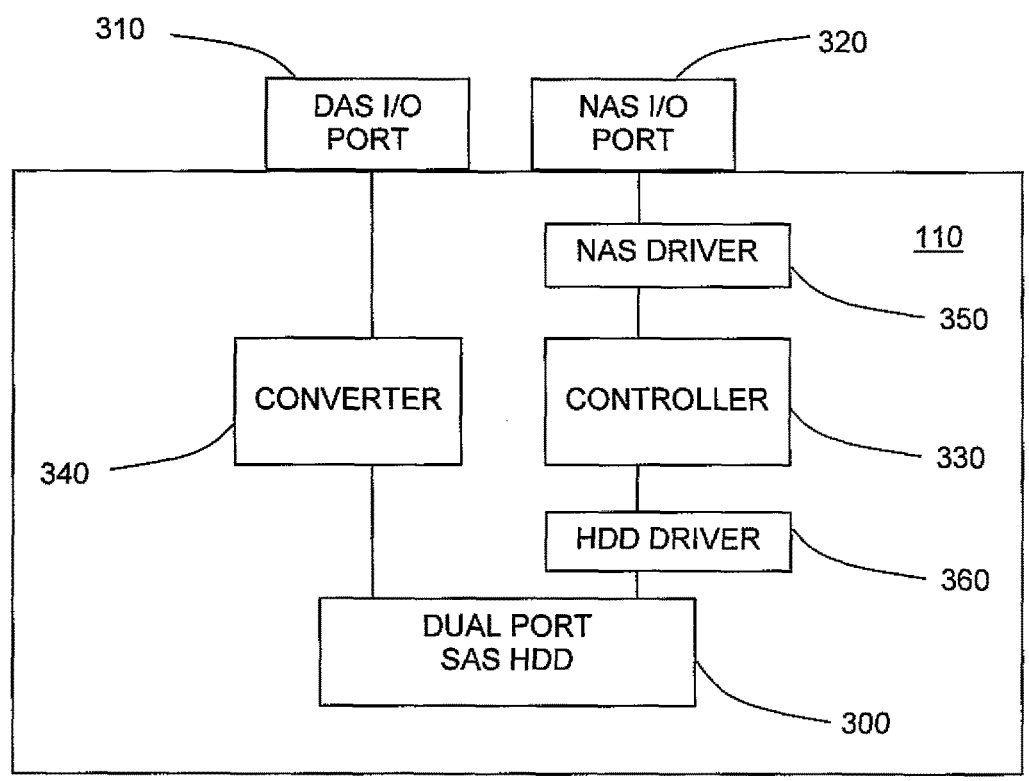
FIG. 3 is a block diagram of a DAS/NAS device in accordance with another herein disclosed embodiment.

FIG. 3 shows an embodiment of a storage device 110 wherein the HDD is a dual port serial attached SCSI (SAS) drive 300. The SAS drive 300 includes a built-in dual-port mechanism and arbitration logic. DAS I/O port 310 can be attached to a device such as a PVR 120, and NAS I/O port 320 can be attached to a network, as described hereinbefore. Converter 340 can be used to connect the DAS port 310 to one port of the dual port SAS HDD 300. The converter 340 can convert between one or more of the physical connection, electrical signals, protocols, and data used by the DAS port 310 (which may be a USB, 1394, or eSATA port, for example) and the SAS HDD 300 port. Controller 330 can be attached to the other port of dual port SAS HDD 300, and can control the communication between NAS I/O port 320 and SAS HDD 300. NAS device driver 350 (such as an IEEE 802.11 driver) provides for interaction of the NAS port with Controller 330, and HDD driver 360 (such as a SAS HDD driver) provides for interaction of the SAS HDD 300 with Controller 330. The built-in dual-port mechanism and arbitration logic of the dual port SAS HDD 300 are used to coordinate access between SAS HDD 300 and I/O ports 310, 320.

In an embodiment, DAS I/O port 310 of the storage device is a USB port that uses a small computer system interface (SCSI) command set. The same SCSI commands and data can be used by both the USB DAS port 310 and the SAS HDD 300 port. Converter 340 can convert between the USB connection, electrical signals, and USB protocol headers used by the DAS I/O port 310, and the serial connections, electrical signals, and SAS protocol headers used by the SAS HDD 300. Thus, converter 340 connects the DAS port 310 to one port of the dual-port SAS HDD 300, and controller 330 can be used to connect NAS I/O port 320 to the other port of the dual-port SAS HDD 300. The SAS HOD 300 can arbitrate requests for simultaneous access from the DAS and NAS ports.

In yet another embodiment, storage device 110 can comprise both a dual-port SAS HDD and one or more additional storage mechanisms. Such storage mechanisms can include one or more optical drives (e.g., DVD recorders), tape drives, flash drives, non-SAS HDDs of one or more other types such as parallel SCSI, IDE, or SATA HDDs, or the like. For example, a SAS HDD can be more expensive than other types of storage, such as other types of HDD having similar storage capacity, and cost savings can be realized by using a SAS HDD in conjunction with one or more HDDs of other types, or other types of storage such as recordable DVDs, tape drives, etc. In addition, a DVD recorder or tape drive can provide essentially unlimited expanded storage capacity by enabling the recorded media to be replaced with fresh media, such as a fresh DVD or tape. Furthermore, a flash drive can provide portability of stored recorded programs, etc.

Figure 4:
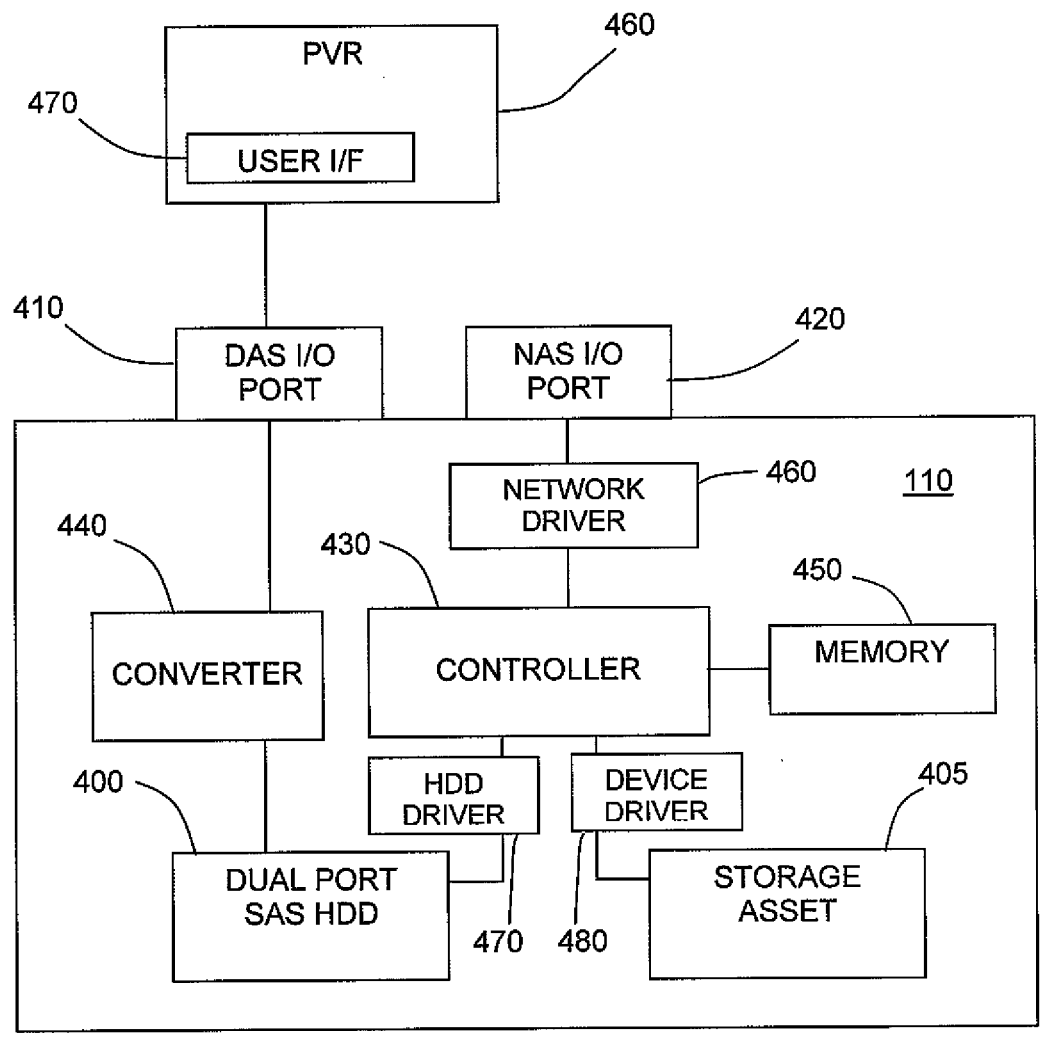
FIG. 4 is a block diagram of a DAS/NAS system in accordance with another herein disclosed embodiment.

Referring now to FIG. 4, shown is a storage system comprising such a storage device 110. Storage device 110 comprises dual-port SAS HDD 400, including built-in dual-port mechanism and arbitration logic as described hereinbefore. DAS I/O port 410 can be attached to a device such as PVR 460, and NAS I/O port 420 can be attached to a network. Converter 440 can be used to connect the DAS port 410 to one port of the dual port SAS HDD 400, and can convert between the DAS port 410 and the port of the SAS HDD 400 to which it is connected, as described hereinbefore. Controller 430 can be used in conjunction with network driver 460 and HDD driver 475 to connect to NAS I/O port 420 and to the other port of the SAS HDD 400, respectively, and the SAS HDD 400 can arbitrate requests for simultaneous access of the SAS and NAS ports, as described hereinbefore. Storage device 110 also comprises additional storage device 405 connected to the controller 430. Device driver 480 provides for interaction of the additional storage device 405 with Controller 430. Data can be migrated between the SAS HDD 400 and the additional storage device 405. The controller 430 controls the migration of the data, in accordance with user instructions and/or one or more migration rules. The user instructions can be entered by a user via user interface 470, which is shown included with PVR 460, although other configurations are possible. For example, the user interface can be provided on the storage device 110, or can be provided in conjunction with a device to which the storage device 110 is attached. Migration rules can be default rules, or can be entered by a user via a user interface. Migration rules can be stored in a storage asset such as SAS HDD 400, or in a memory such as memory 450 connected to the controller 430, or the like. In an embodiment, no migration rules are stored, and migration activities are directly invoked by the user, such as via user interface 470.

In an exemplary implementation, storage device 110 can be attached to PVR 460 via DAS port 410. PVR 460 provides user interface 470 for a user to indicate one or more instructions and/or rules for migrating data between the SAS HDD 400 and the additional storage 405 of the storage device 110, such as a non-SAS HDD. Such a user interface can comprise, for example, an on-screen display or graphical user interface (GUI) viewable on an attached viewing device, which the user can interact with using a remote control for example, although other user interfaces can be used. The instructions and/or rules can be communicated to the controller 430 via a connection from user interface 470 to the controller (not shown), or can be communicated to the memory 450 via a connection from the user interface to the memory (not shown). Under the direction of the controller 430, data can be migrated between SAS HDD 400 and additional storage 405 in the background. Thus for example, the PVR 460 can record content to a high performance SAS HDD 400, and then after some select or default time has elapsed, or after events have occurred based on one or more user selected or default rules (such as a rule to migrate all files older than seven days), the recorded content can be migrated to the additional storage 405. Alternatively, the user can manually or explicitly specify the migration of one or more files, such as by clicking on a recorded show and/or dragging and dropping it on an icon representing the alternate storage 405 via user interface 470. The user interface can be provided by the PVR vendor, for example, in firmware of the PVR 460.

Figure 5:
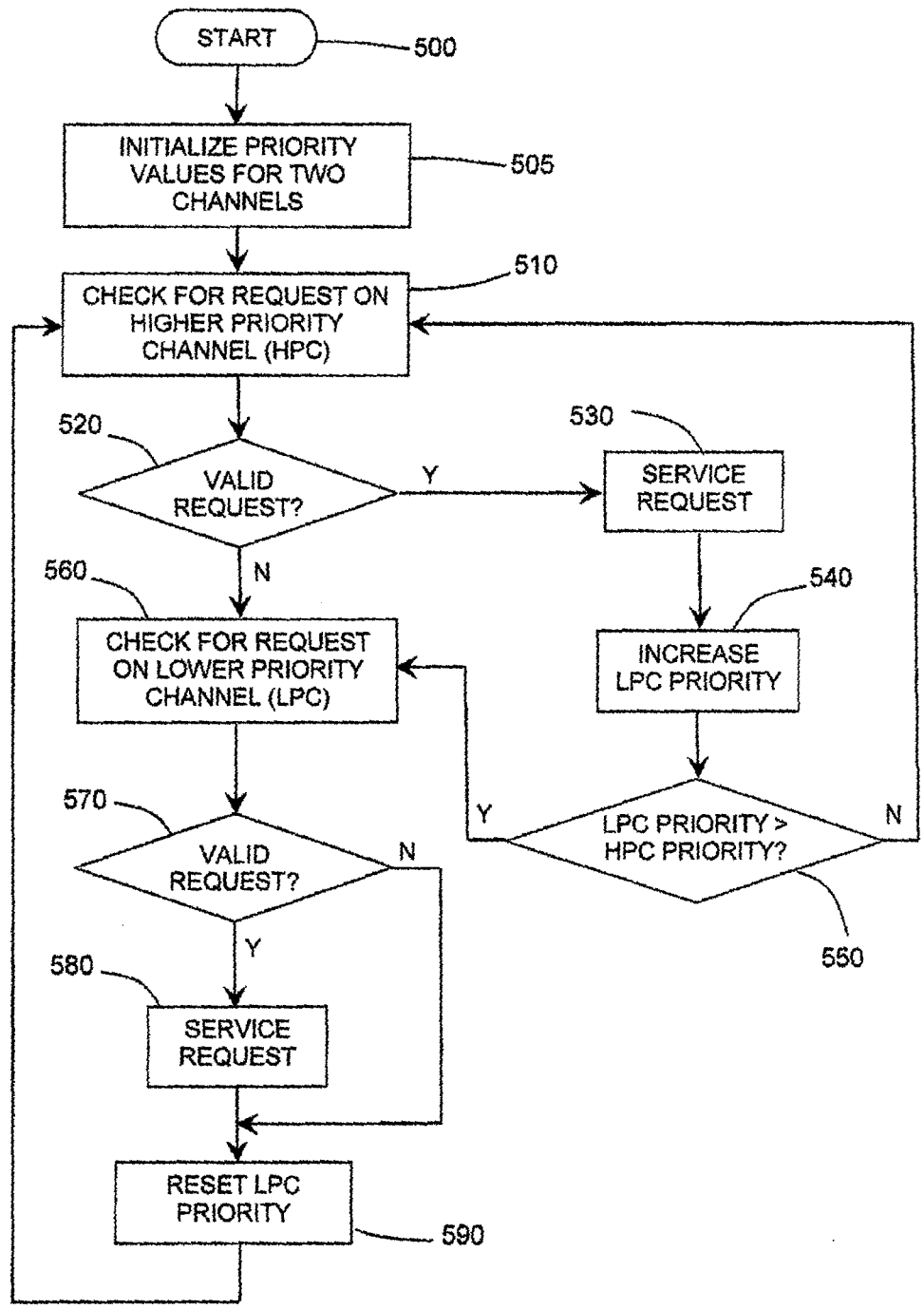
FIG. 5 is a flow diagram showing operation of a system in accordance with a herein disclosed embodiment.

FIG. 5 is a flow diagram showing exemplary operation of a priority multiplexor for managing requests for access to a single storage asset, such as a HDD, from two different requesters, such as a DAS I/O port and a NAS I/O port. For example, priority mux 250 of FIG. 2, and arbitration logic of dual port SAS HDD 300, 400 of FIGS. 3 and 4 respectively, can be operated in accordance with the flow diagram of FIG. 5, although other methods of operation can be used. As is shown, processing begins at block 500 and proceeds to block 505 where initial priority values are established for two channels, each channel for receiving service requests from a different requester. The initial values can be default values, or can be entered by a user such as via a user interface. For example, a higher initial value can be established for the DAS port channel than for the NAS port channel, as hereinbefore described. From there, processing proceeds to block 510 where the higher priority channel (HPC) is checked for a request for access to the storage asset, and processing proceeds to block 520. At block 520, if a valid request is not received on the HPC, processing proceeds to block 560. However, if a valid request is received, processing proceeds to block 530 where the request is serviced, thereby providing the requester with access to the storage asset. From there, processing proceeds to block 540, where the priority of the lower priority channel (LPC) is increased. A check is then performed at block 550 to determine if the LPC priority is now greater than the HPC priority. If not, processing reverts back to block 510 and proceeds from there. However, if the check at block 550 determines that the LPC priority is greater than the HPC priority, processing proceeds to block 560.

At block 560 the LPC is checked for a request for access to the storage asset, and processing proceeds to block 570. At block 570, if a valid request is not received on the LPC, processing proceeds to block 590. However, if a valid request is received, processing proceeds to block 580 where the request is serviced, thereby providing the requester with access to the storage asset. From there, processing proceeds to block 590. At block 590, the LPC priority is reset to its original value, and processing reverts back to block 510.

Thus as shown, the LPC starts with a low priority number; and the HPC with a higher number. The HPC checks for and services a request first. When complete, the LPC's priority is raised, and if greater than the HPC's the LPC is checked for requests and serviced. In another embodiment, equal initial priority values can be established for the LPC priority and the HPC priority. If so, the two channels are treated equally, and can take turns checking for and servicing requests. In yet another embodiment, the initial value of the HPC priority can be given a much higher value than the LPC priority, allowing correspondingly large blocks of HPC requests to be serviced before each single LPC request is serviced. Thus, the HPC can "block out" the LPC for some number of operations, determined by the amount by which the HPC priority number exceeds the initial LPC priority number. If the LPC's priority is not greater than the HPC's, the process checks for a service request on the HPC without first checking the LPC.

In the drawings, system components of storage device 110 intercommunicate via communication paths, indicated by single lines for simplicity of presentation. The communication paths can comprise a single wire or a plurality of wires. Other types of communications paths can also be used such as parallel or serial communication busses, fiber optic paths, wireless communication paths, or the like. Furthermore, although shown in conjunction with particular elements, such as block 240 of controller 230 in FIG. 2, the logic, file system, drivers, and the like can reside elsewhere in the storage device 110. Moreover, the logic, file system, drivers and the like can comprise computer readable instructions stored in a computer readable storage medium that cause the storage device to perform the herein described operations.

The various storage device embodiments described herein can provide DAS connectivity to enable a device such as a PVR to expand its storage by using a storage device directly attached to the PVR. At the same time, NAS connectivity is provided to the same storage device, to enable PCs and other devices on a network to have shared access to files stored on the storage device, including content stored in the storage device via its DAS connection, such as programs recorded by the PVR. In addition, programs stored on devices elsewhere on the network can be downloaded through the NAS port and played back by the PVR via the DAS port.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A multi-port storage device connectable simultaneously to both a direct-attached device and a network-attached device, comprising:
   a storage drive;
   a direct-attached storage (DAS) port to connect the multi-port storage device to the direct-attached device;
   a network-attached storage (NAS) port to connect the multi-port storage device to the network-attached device; and
   a controller coupled to the DAS port, the NAS port, and the storage drive, to:
   control access to the storage drive by the DAS port and the NAS port while the DAS port is connected to the direct-attached device and while the NAS port is simultaneously connected to the network-attached device, wherein the controller is to, as part of controlling the access based on the DAS port initially having a higher priority than the NAS port, provide the DAS port with priority access to the storage drive responsive to receiving requests for simultaneous access to the storage drive from the DAS port and the NAS port,
   increase a priority of the NAS port in response to receiving and servicing a request received through the DAS port, and
   process a request received through the NAS port to access the storage drive according to the increased priority of the NAS port.

2. The multi-port storage device of claim 1, wherein the NAS port comprises an Ethernet port.

3. The multi-port storage device of claim 1, wherein the DAS port comprises a universal serial bus (USB) port, an external Serial Advanced Technology Attachment (eSATA) port, or an IEEE 1394 port.

4. The multi-port storage device of claim 1, wherein the controller is to arbitrate access to the storage drive by the DAS port and the NAS port responsive to receiving the requests for the simultaneous access to the storage drive from the DAS port and the NAS port.

5. The multi-port storage device of claim 4, further comprising a real-time operating system (OS) to direct operation of the controller.

6. The multi-port storage device of claim 4, wherein the controller comprises a driver of the storage drive that acts as an arbitrator of requests for storage drive access received from the DAS port and the NAS port.

7. The storage device of claim 1, wherein the storage drive comprises a hard disk drive.

8. A multi-port storage device useable simultaneously by both a direct-attached device and a network-attached device, comprising:
   a storage drive comprising a first drive port, a second drive port, and an arbitrator to arbitrate requests for simultaneous access to the storage drive by the direct-attached device and the network-attached device;
   a direct-attached storage (DAS) port coupled to the first drive port of the storage drive; and
   a network-attached storage (NAS) port coupled to the second drive port of the storage drive, wherein the requests for simultaneous access to the storage drive comprise a first request from the direct-attached device received through the DAS port, and a second request from the network-attached device received through the NAS port,
   the arbitrator to:
   based on the DAS port initially having a higher priority than the NAS port, provide the direct-attached device with priority access to the storage drive by servicing the first request received through the DAS port,
   increase a priority of the NAS port in response to the servicing of the first request received through the DAS port, and
   process the second request received through the NAS port to access the storage drive according to the increased priority of the NAS port.

9. The multi-port storage device of claim 8, further comprising a converter coupled between the DAS port and the first drive port to convert between signals used by the first drive port of the storage drive and signals used by the DAS port.

10. The multi-port storage device of claim 8, further comprising:
a storage asset and a controller to migrate data between the storage drive and the storage asset.

11. The multi-port storage device of claim 10, wherein the controller is to control migration of data between the storage drive and the storage asset in accordance with a user instruction.

12. The multi-port storage device of claim 10, further comprising:
a memory coupled to the controller to store a migration rule, wherein the controller is to control migration of data between the storage drive and the storage asset in accordance with the migration rule.

13. The multi-port storage device of claim 12, wherein the migration rule is a default rule or a rule entered by a user.

14. The multi-port storage device of claim 10, wherein the storage asset includes one or more of a serial advanced technology attachment (SATA) storage drive, a parallel small computer system interface (SCSI) storage drive, an integrated drive electronics (IDE) storage drive, a digital versatile/video disk (DVD) recorder, a tape drive, and a flash drive.

15. The multi-port storage device of claim 8, wherein the DAS port comprises a universal serial bus (USB) port, an external Serial Advanced Technology Attachment (eSATA) port, or an IEEE 1394 port.

16. A method comprising:
providing a multi-port storage device comprising a direct access storage (DAS) port and a network attached storage (NAS) port within a single enclosure;
receiving requests for simultaneous access of a storage drive in the multi-port storage device, the multi-port storage device comprising a first drive port and a second drive port, the requests comprising a first request received through the DAS port from a first device, and a second request received through the NAS port from a second device; and
in response to the requests for simultaneous access of the storage drive, performing, by a controller in the multi-port storage device:
servicing the first request received through the DAS port from the first device, responsive to the DAS port initially having a higher priority than the NAS port,
increasing a priority of the NAS port in response to the servicing of the first request received through the DAS port from the first device; and
processing the second request received through the NAS port from the second device according to the increased priority of the NAS port.

17. The method of claim 16, wherein the storage drive comprises a serial attached SCSI (SAS) storage drive.

18. The method of claim 16, wherein the controller is external of the storage drive.

19. The method of claim 16, wherein the controller comprises an arbitrator in the storage drive.

* * * * *